(12) United States Patent
Sato

(10) Patent No.: US 8,789,369 B2
(45) Date of Patent: Jul. 29, 2014

(54) SUPERCHARGING APPARATUS FOR VEHICLE

(75) Inventor: Osamu Sato, Takahama (JP)

(73) Assignee: Denso Corporation, Kariya (JP)

( * ) Notice: Subject to any disclaimer, the term of this patent is extended or adjusted under 35 U.S.C. 154(b) by 48 days.

(21) Appl. No.: 13/546,045

(22) Filed: Jul. 11, 2012

(65) Prior Publication Data

US 2013/0014502 A1 Jan. 17, 2013

(30) Foreign Application Priority Data

Jul. 12, 2011 (JP) ................. 2011-153850

(51) Int. Cl.
| | |
|---|---|
| F02D 23/00 | (2006.01) |
| F01N 3/00 | (2006.01) |
| F01N 3/027 | (2006.01) |
| F01B 25/00 | (2006.01) |
| F01D 17/00 | (2006.01) |
| F01D 19/00 | (2006.01) |
| F01D 21/00 | (2006.01) |

(52) U.S. Cl.
USPC ............. 60/602; 415/175; 415/176; 415/178; 415/145; 415/13; 415/17; 415/26; 415/30; 415/47; 60/286

(58) Field of Classification Search
None
See application file for complete search history.

(56) References Cited

U.S. PATENT DOCUMENTS

| | | | | | |
|---|---|---|---|---|---|
| 4,075,990 | A | * | 2/1978 | Ribeton | 123/559.1 |
| 4,122,673 | A | * | 10/1978 | Leins | 60/274 |
| 4,549,398 | A | * | 10/1985 | Oishi et al. | 60/286 |
| 5,016,437 | A | * | 5/1991 | Huether et al. | 60/280 |
| 5,709,081 | A | * | 1/1998 | Bruestle | 60/274 |
| 6,149,074 | A | * | 11/2000 | Friedel et al. | 239/127.1 |
| 6,397,588 | B1 | * | 6/2002 | Bruck et al. | 60/299 |
| 6,467,258 | B1 | * | 10/2002 | Jobson et al. | 60/285 |
| 6,604,362 | B2 | * | 8/2003 | Moeckel | 60/614 |
| 7,818,960 | B2 | * | 10/2010 | Gonze et al. | 60/286 |
| 8,091,347 | B2 | * | 1/2012 | Hara et al. | 60/297 |
| 8,250,866 | B2 | * | 8/2012 | Styles et al. | 60/605.2 |
| 8,333,550 | B2 | * | 12/2012 | Fahl | 415/116 |
| 2003/0110769 | A1 | * | 6/2003 | Moeckel | 60/608 |
| 2003/0172642 | A1 | * | 9/2003 | Nakatani et al. | 60/277 |
| 2006/0053773 | A1 | * | 3/2006 | Mayer et al. | 60/286 |
| 2006/0196166 | A1 | * | 9/2006 | Fukuma | 60/274 |
| 2006/0288678 | A1 | * | 12/2006 | Yoshida | 55/523 |
| 2008/0022678 | A1 | * | 1/2008 | Irisawa et al. | 60/600 |
| 2009/0094966 | A1 | * | 4/2009 | Huslig | 60/302 |
| 2011/0023469 | A1 | * | 2/2011 | Berke et al. | 60/295 |
| 2011/0296831 | A1 | * | 12/2011 | Pursifull | 60/602 |
| 2012/0102917 | A1 | * | 5/2012 | Gibson et al. | 60/273 |
| 2013/0125542 | A1 | * | 5/2013 | Hayakawa | 60/602 |

FOREIGN PATENT DOCUMENTS

| | | | | |
|---|---|---|---|---|
| DE | 4139291 A1 | * | 6/1993 | F01N 3/18 |
| DE | 10203309 A1 | * | 7/2003 | F02B 37/20 |
| FR | 2483515 A | * | 12/1981 | |
| JP | 5-321804 | | 12/1993 | |
| JP | 10-299461 | | 11/1998 | |
| JP | 2004360513 A | * | 12/2004 | F01N 3/02 |

* cited by examiner

*Primary Examiner* — Thomas Denion
*Assistant Examiner* — Jessica Kebea
(74) *Attorney, Agent, or Firm* — Nixon & Vanderhye PC

(57) ABSTRACT

A turbocharger of a supercharging apparatus includes a turbine impeller, which is rotatable by exhaust gas discharged from an internal combustion engine of a vehicle. An electric heater is placed in an exhaust passage, which extends from an exhaust outlet of the internal combustion engine to the turbine impeller. The electric heater generates a heat when the electric heater is energized.

5 Claims, 8 Drawing Sheets

FIG. 3
|  | ELECTRIC HEATER | VOLUME CHANGING VALVE | WASTEGATE VALVE |
|---|---|---|---|
| 1ST MODE | ON | CLOSE | CLOSE |
| 2ND MODE | OFF | CLOSE | CLOSE |
| 3RD MODE | OFF | OPEN | CLOSE |
| 4TH MODE | OFF | OPEN | OPEN |
| 5TH MODE | ON | OPEN | OPEN |
FIG. 4A
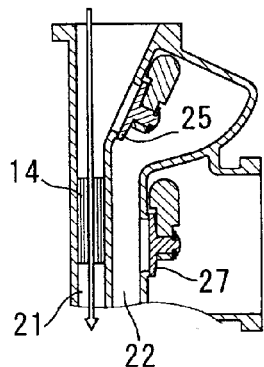
FIG. 4B
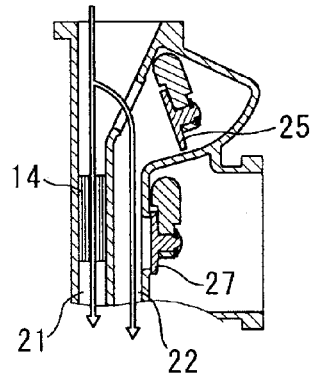
FIG. 4C
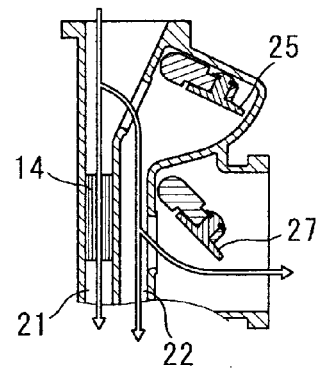
FIG. 5
|  | ROTATION SPEED | | |
|---|---|---|---|
|  | LOW | MIDDLE | HIGH |
| FAST IDLE AT COLD START | 5TH MODE | — | — |
| IDLING | 4TH MODE | — | — |
| LOAD: SMALL | 4TH MODE | 4TH MODE | 4TH MODE |
| LOAD: MIDDLE | 3RD MODE | 3RD MODE | 4TH MODE |
| LOAD: LARGE | 1ST→2ND MODE | 3RD MODE | 4TH MODE |

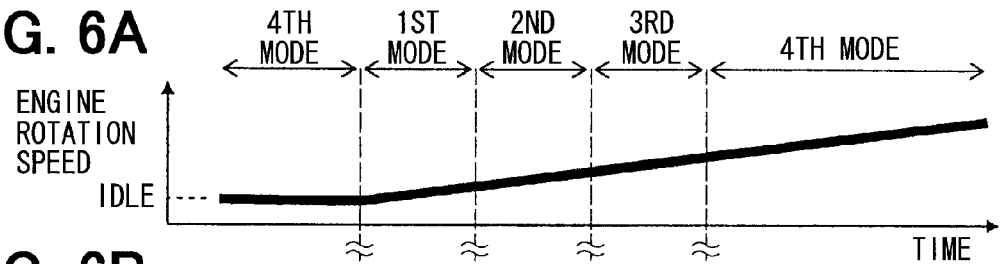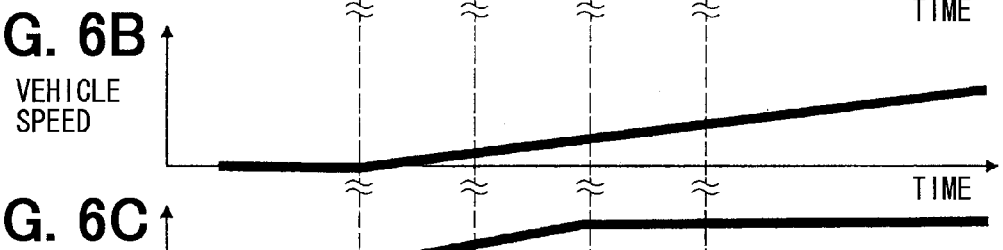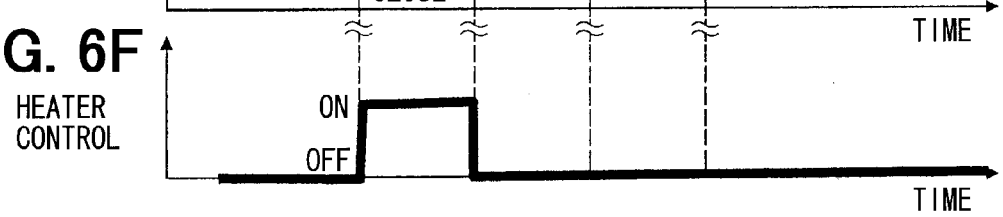

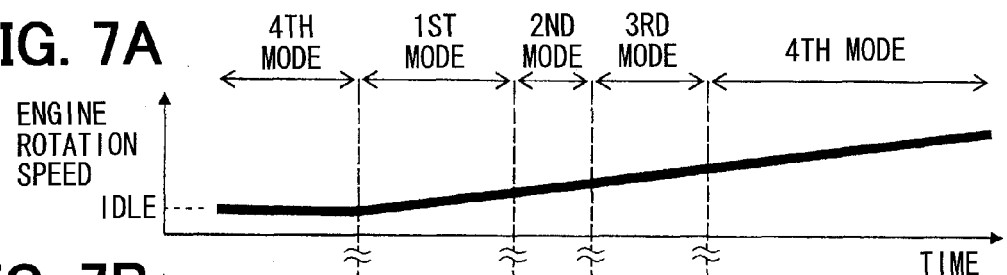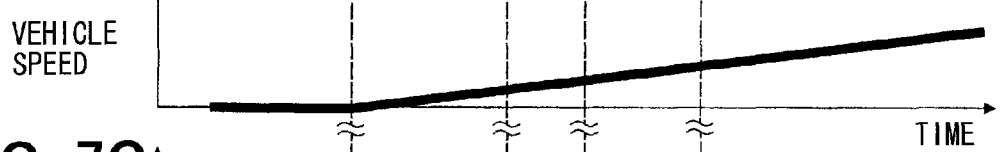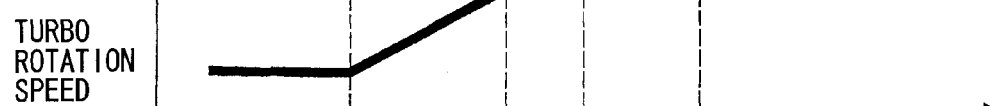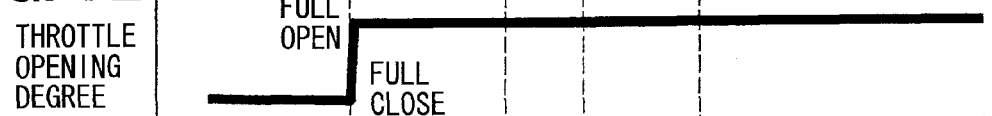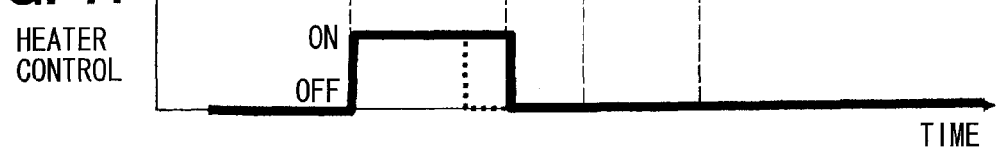

FIG. 9

|  | ELECTRIC HEATER | VOLUME CHANGING VALVE | WASTEGATE VALVE |
|---|---|---|---|
| 1ST MODE | ON | CLOSE | CLOSE |
| 2ND MODE | OFF | CLOSE | CLOSE |
| 3RD MODE | OFF | OPEN | CLOSE |
| 4TH MODE | OFF | OPEN | OPEN |
| 5TH MODE | ON | CLOSE | OPEN |

SUPERCHARGING APPARATUS FOR VEHICLE

CROSS REFERENCE TO RELATED APPLICATION

This application is based on and incorporates herein by reference Japanese Patent Application No. 2011-153850 filed on Jul. 12, 2011.

TECHNICAL FIELD

The present disclosure relates to a supercharging apparatus for a vehicle.

BACKGROUND

In a supercharging apparatus of a vehicle, which includes a turbocharger, intake air is pressurized through use of exhaust energy of an internal combustion engine. Therefore, when the exhaust energy is decreased, a boost pressure is decreased. That is, in a case where the flow quantity of the exhaust gas is small, or the temperature of the exhaust gas is low, the boost pressure is decreased. Thus, at the time of depressing an accelerator pedal with a foot of a driver of the vehicle to accelerate the vehicle, turbo lag may possibly be generated to deteriorate the drivability.

For instance, JP H05-321804A proposes a technique of shortening the turbo lag by increasing the exhaust energy at the acceleration time.

The technique of JP H05-321804A increases the exhaust energy by retarding the ignition timing.

However, when the ignition timing is retarded from the appropriate timing, the combustion of the appropriate timing cannot be achieved. Thus, the output torque of the engine is reduced, and the drivability is deteriorated. Furthermore, the fuel consumption is also deteriorated.

SUMMARY

The present disclosure is made in view of the above disadvantages.

According to the present disclosure, there is provided a supercharging apparatus for a vehicle, including a turbocharger and an electric heater. The turbocharger includes a turbine impeller, which is rotatable by exhaust gas discharged from an internal combustion engine of the vehicle. The electric heater is placed in an exhaust passage, which extends from an exhaust outlet of the internal combustion engine to the turbine impeller. The electric heater generates a heat when the electric heater is energized.

BRIEF DESCRIPTION OF THE DRAWINGS

The drawings described herein are for illustration purposes only and are not intended to limit the scope of the present disclosure in any way.

FIG. 3 is a diagram showing operational states of an electric heater, the volume changing valve and the wastegate valve for respective operation modes according to the first embodiment;

FIGS. 4A to 4C are schematic diagrams showing various operational states of the volume changing valve and the wastegate valve of the first embodiment;

FIG. 5 is a diagram showing respective operation modes, which correspond to an engine rotational speed and a demanded engine load according to the first embodiment;

FIGS. 6A to 6F are diagrams showing time charts for describing the operation according to the first embodiment;

FIGS. 7A to 7F are diagrams showing time charts for describing the operation according to the first embodiment;

FIG. 9 is a diagram showing operational states of an electric heater, a volume changing valve and a wastegate valve for respective operation modes according to the second embodiment.

DETAILED DESCRIPTION

Figure 1:
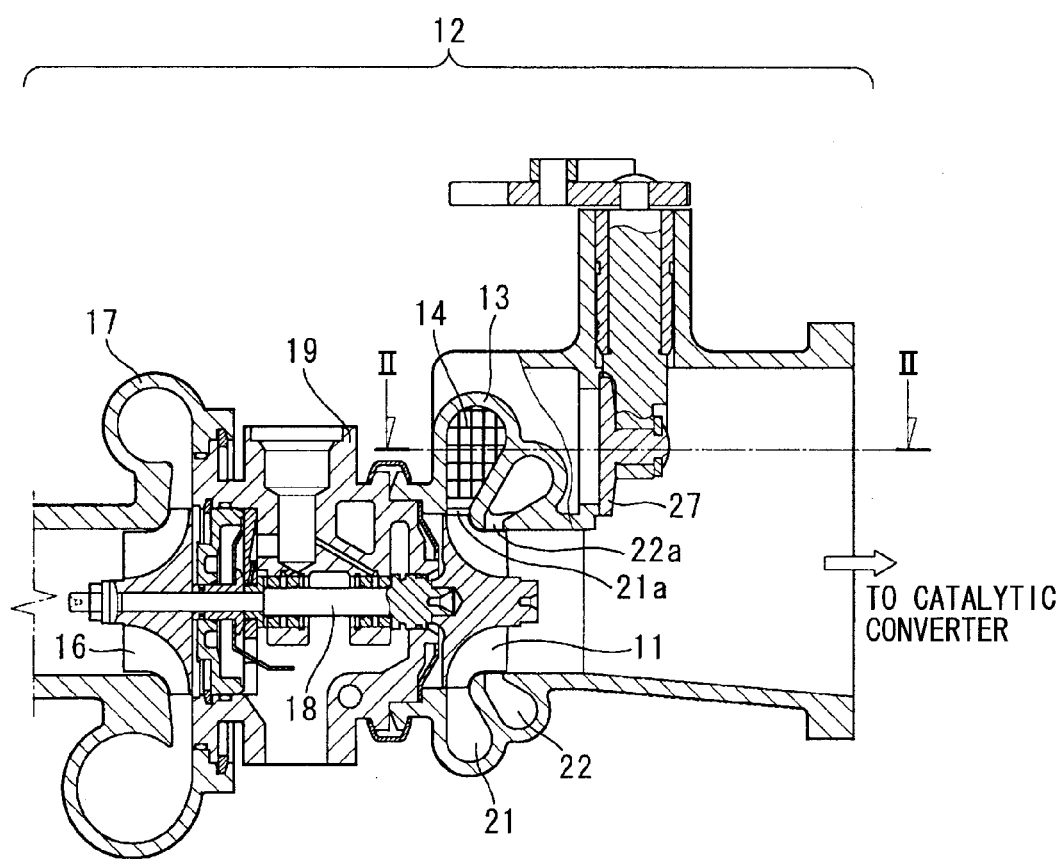
FIG. 1 is a cross-sectional view of a turbocharger of a first embodiment of the present disclosure, which is taken along an axis of the turbocharger.

Various embodiments of the present disclosure will be described with reference to the accompanying drawings. The following embodiments are mere examples of the present disclosure, and the present disclosure is not limited to the following embodiments.

In the following embodiments, respective similar components, which has a corresponding common function, will be indicated by the same reference numeral throughout the specification.

First Embodiment

A first embodiment of the present disclosure will be described with reference to FIGS. 1 to 7F.

A supercharging apparatus for a vehicle supercharges intake air, which is supplied to an internal combustion engine (e.g., a gasoline engine, a diesel engine), through use of a turbocharger 12.

The turbocharger 12 boosts the intake air, which is drawn into the engine, through use of energy of exhaust gas that is outputted from the engine. As shown in FIG. 1, the turbocharger 12 includes a turbine impeller 11, a turbine housing 13, a compressor impeller 16, a compressor housing 17, a shaft 18 and a bearing housing 19. The turbine impeller 11 is rotated by the exhaust gas, which is discharged from the engine. The turbine housing 13 is configured into a spiral form and receives the turbine impeller 11. The compressor impeller 16 is rotated by a rotational force of the turbine impeller 11 to pressurize the intake air.

In the turbocharger 12, the bearing housing 19 is placed between the turbine housing 13 and the compressor housing 17 and is connected to the turbine housing 13 and the compressor housing 17 through a connecting means, such as a V-band, a snap ring or a bolt.

The turbine impeller 11 includes a hub and a plurality of turbine blades. The hub is connected to the shaft 18 and is rotatably supported. The turbine blades extend radially outward from the hub and are arranged one after another in a circumferential direction.

An outermost peripheral edge part of each turbine blade is referred to as a leading edge, and a downstream side peripheral edge part of the turbine blade, which is located on the downstream side of the leading edge in the flow direction of the exhaust gas, is referred to as a trailing edge. Furthermore, an outer peripheral edge part of the turbine blade, which is located between the leading edge and the trailing edge, is referred to as a shroud edge.

A first exhaust scroll 21 and a second exhaust scroll 22, from which the exhaust gas is discharged, i.e., is blown toward the turbine impeller 11, are formed in the inside of the turbine housing 13.

The first exhaust scroll 21 includes a first exhaust outlet 21a. The exhaust gas, which is discharged from the engine, is swirled through the first exhaust scroll 21. Then, the swirled exhaust gas is discharged from the first exhaust scroll 21 toward an upstream end part (the leading edges of the turbine blades) of the turbine impeller 11, which is located on the upstream side in the flow direction of the exhaust gas, through the first exhaust outlet 21a of the first exhaust scroll 21.

The second exhaust scroll 22 includes a second exhaust outlet 22a. The exhaust gas, which is discharged from the engine, is swirled through the second exhaust scroll 22 in the same direction as that of the first exhaust scroll 21. Then, the swirled exhaust gas is discharged from the second exhaust scroll 22 toward a middle part (the shroud edges of the turbine blades) of the turbine impeller 11, which is located on a downstream side of the first exhaust outlet 21a, through the second exhaust outlet 22a of the second exhaust scroll 22.

Figure 2A:
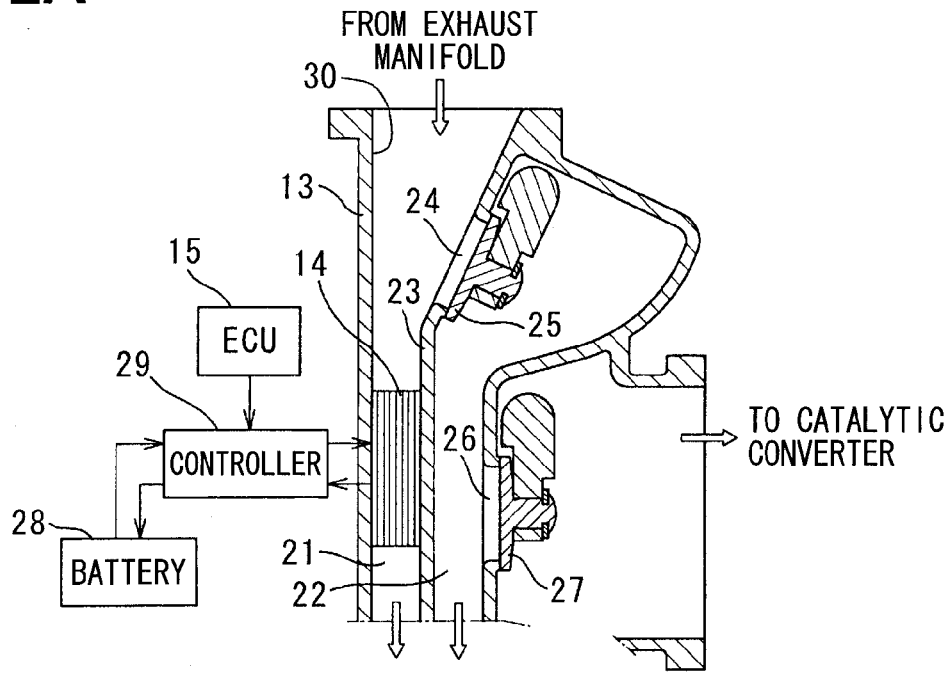
FIG. 2A is a cross-sectional view taken along line II-II in FIG. 1.
Figure 2B:
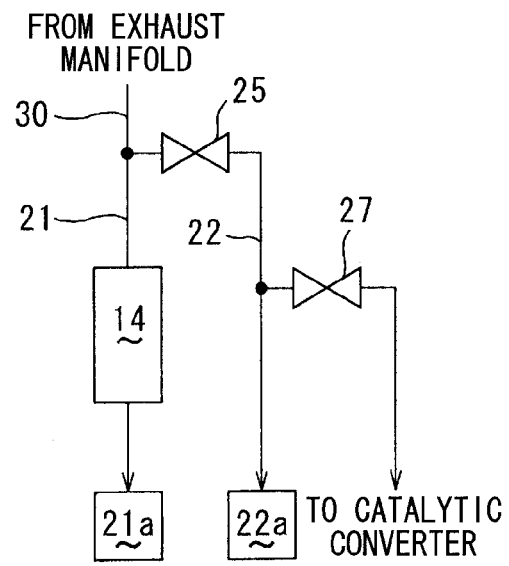
FIG. 2B is a schematic diagram showing a volume changing valve and a wastegate valve of the first embodiment.
Figure 8A:
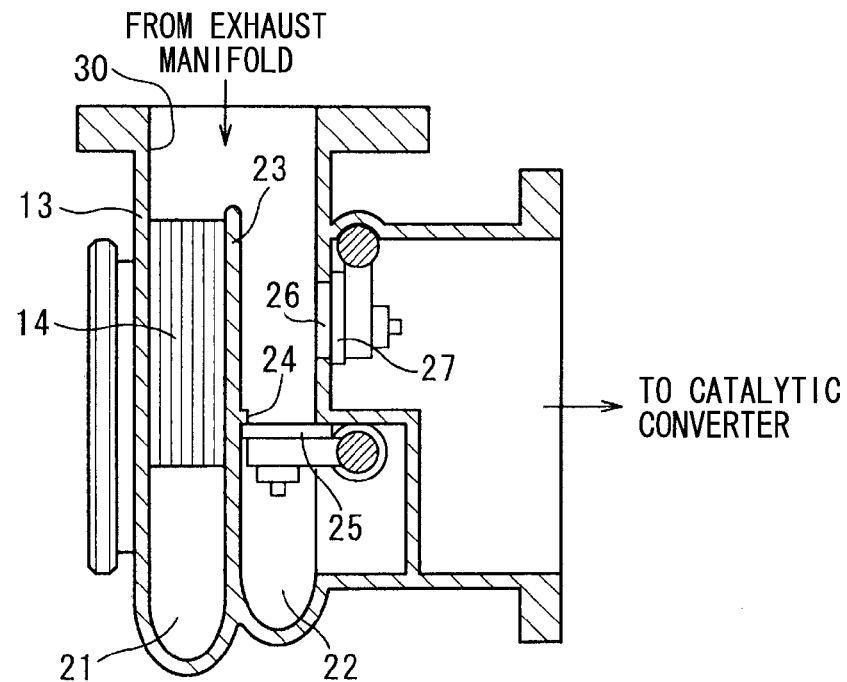
FIG. 8A is a partial cross-sectional view of a turbocharger according to a second embodiment of the present disclosure.
Figure 8B:
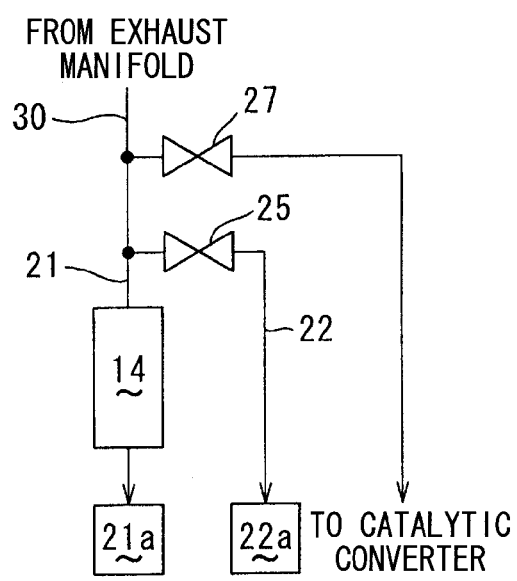
FIG. 8B is a schematic diagram showing a volume changing valve and a wastegate valve of the second embodiment.

As shown in FIG. 2A, a partition wall 23, which partitions between the first exhaust scroll 21 and the second exhaust scroll 22, is formed in the inside of the turbine housing 13.

An upstream part of the first exhaust scroll 21, which is located on the upstream side in the flow direction of the exhaust gas, is always communicated with an exhaust inlet of the turbine housing 13 (a connection opening of the turbine housing 13, which is connected to the exhaust manifold forming the exhaust outlet of the engine), so that the exhaust gas is always supplied into the first exhaust scroll 21.

Furthermore, a passage cross-sectional area of the upstream part of the first exhaust scroll 21 is progressively reduced by the partition wall 23 toward the downstream side in the flow direction of the exhaust gas to have a constriction.

The partition wall 23, which forms this constriction, has a volume changing communication hole 24 that communicates between the first exhaust scroll 21 and the second exhaust scroll 22. This volume changing communication hole 24 is opened and closed by the volume changing valve 25.

An opening degree of the volume changing valve 25 is controlled by an electronic control unit (ECU) 15 through an electric actuator (not shown). When the opening degree of the volume changing communication hole 24 is controlled by the volume changing valve 25, a quantity of the exhaust gas, which flows from the second exhaust scroll 22 toward the turbine impeller 11, is controlled.

As shown in FIG. 2A, a wastegate communication hole 26 is formed in an outer wall of the second exhaust scroll 22 to guide a portion of the exhaust gas, which is conducted to the second exhaust scroll 22, toward the downstream side (toward a muffler) while bypassing the turbine impeller 11. The wastegate communication hole 26 is opened and closed by the wastegate valve 27.

An opening degree of the wastegate valve 27 is controlled by the ECU 15 through an electric actuator (not shown). When the opening degree of the wastegate communication hole 26 is controlled by the wastegate valve 27, a quantity of the exhaust gas, which flows through the wastegate communication hole 26 toward the downstream side (toward the muffler) while bypassing the turbine impeller 11, is controlled.

The volume changing valve 25 and the wastegate valve 27 may be driven by two electric actuators, respectively. Alternatively, the volume changing valve 25 and the wastegate valve 27 may be driven by a single electric actuator and a linkage device, which converts rotational characteristics.

The vehicle of the present embodiment includes an electric heater 14, which is placed in a portion of an exhaust passage 30 that extends from the exhaust outlet of the engine to the turbine impeller 11. The electric heater 14 is heated upon energization thereof.

In one exemplary case, the electric heater 14 is placed in a corresponding part of the exhaust passage 30, which is defined in the turbine housing 13.

More specifically, in the present embodiment, as shown in FIG. 2A, the electric heater 14 is placed in the corresponding part of the exhaust passage 30 (the part of the exhaust passage 30 between the portion of the first exhaust scroll 21, which forms the volume changing communication hole 24, and the first exhaust outlet 21a) in the first exhaust scroll 21.

A type of the electric heater 14 is not limited to any particular one. However, in the present embodiment, as one specific example, the electric heater 14 is a ceramic heater, which uses a positive temperature coefficient (PTC) thermistor as a heating element. The PTC thermistor has a positive temperature coefficient, so that a value of resistance of the PTC thermistor is increased in response to a temperature increase.

The electric heater 14 is configured to coincide with a shape of the corresponding passage of the first exhaust scroll 21, in which the electric heater 14 is installed. The electric heater 14 is fixed to the inside of the turbine housing 13 by using an undepicted fixing means (e.g., screws) after the installation of the electric heater in the first exhaust scroll 21.

Here, the flow resistance of the electric heater 14 should be limited to enable smooth flow of the exhaust gas in the first exhaust scroll 21. As a specific example, a honeycomb heater, which has a grid cross section, is used as the electric heater 14 in this embodiment.

An energization state (on/off state) of the electric heater 14 is controlled by the ECU 15.

Specifically, the electric heater 14 receives the supply of the electric power from a battery 28, which is installed in the vehicle. A controller 29 (an on-off control means, which uses, for example, a relay and a switching element to turn on or off the electric power) is interposed between the electric heater 14 and the battery 28 to change the energization state of the electric heater 14 between the energized state and the deenergized state. The controller 29 is controlled by the ECU 15. When the ECU 15 controls the controller 29, the energization state of the electric heater 14 is consequently controlled.

As discussed above, the operations (the opening/closing and the energization) of the volume changing valve 25, the wastegate valve 27 and the electric heater 14 are controlled by the ECU 15.

The ECU 15 is an electronic control device that includes a computer of a known type having a CPU and a memory. The ECU 15 controls the operations of the volume changing valve 25, the wastegate valve 27 and the electric heater 14 based on the operational state of the engine (including a manipulation state of the engine that is manipulated by a driver of the vehicle).

The ECU 15 energizes the electric heater 14 in a state where the exhaust energy is small, and a large engine output is demanded. The ECU 15 has a heater control means (control program), which energizes the electric heater 14 in a state where the engine rotational speed (rotation speed) is low (in the low range), and a demanded engine load (e.g., an opening degree of the accelerator, i.e., an amount of depression of an accelerator pedal) is large (in the large range).

Specifically, a heater control map, which is used to execute the energization of the electric heater 14 based on the engine rotational speed and the demanded engine load, is stored in the memory of the ECU 15 to execute the energization of the electric heater 14 based on the operational state of the engine and the map.

The ECU 15 of the present embodiment receives signals from various sensors to obtain the coolant temperature (the temperature of the coolant, which is circulated through the engine), the oil temperature (the temperature of the engine lubricating oil), the exhaust temperature (the temperature of the exhaust manifold located between the engine and the turbocharger 12).

Furthermore, the ECU 15 has an extending means (control program) for extending the energization period of the electric heater 14 at the time of energizing the electric heater 14 through the above described control operation in one of (i) a state where the coolant temperature is lower than a predetermined coolant temperature, (ii) a state where the oil temperature is lower than a predetermined oil temperature, and (iii) a state where the exhaust temperature is lower than a predetermined exhaust temperature.

The extending period of the energization of the electric heater 14 may be a fixed time period or may be a variable time period, which is changed based on the sensed temperature(s).

Furthermore, the ECU 15 of the present embodiment has a warming-up promoting means (control program) for actively heating a catalytic converter located in a middle of the exhaust passage 30 placed on the downstream side of the turbocharger 12 through the energization of the electric heater 14 in the engine warming-up period (e.g., a fast idle period) that is immediately after the starting of the engine on the cold engine start-up.

Furthermore, the warming-up promoting means of the present embodiment is set to open the wastegate valve 27 at the time of energizing the electric heater 14 during the engine warming-up period, so that the exhaust gas (i.e., the high temperature exhaust gas, from which the heat is not taken by the turbine impeller 11) flows toward the downstream side (toward the muffler) through the wastegate communication hole 26 while bypassing the turbine impeller 11 and thereby heats the catalytic converter.

Next, the operations of the volume changing valve 25, the wastegate valve 27 and the electric heater 14, which are classified into first to fifth modes, will be described with reference to FIG. 3.

(I) The first mode is an operation mode, in which the entire exhaust gas is supplied to the first exhaust scroll 21, and the exhaust gas to be supplied to the turbine impeller 11 after passing through the first exhaust scroll 21 is heated with the electric heater 14. In the first mode, as shown in FIG. 4A, both of the volume changing valve 25 and the wastegate valve 27 are closed, and the electric heater 14 is energized.

Specifically, as shown in FIG. 5, the first mode is the operation mode that is selected in an initial stage (a state where turbo lag is generated) in a case where the engine rotational speed is low, and the demanded engine load is large (e.g., the acceleration start time).

(II) The second mode is an operation mode, in which the entire exhaust gas is supplied only to the first exhaust scroll 21, like in the first mode. However, in the second mode, the electric heater 14 is not energized. That is, as shown in FIG. 4A, both of the volume changing valve 25 and the wastegate valve 27 are closed, and the energization of the electric heater 14 is stopped.

Specifically, as shown in FIG. 5, the second mode is the operation mode that is selected in the case where the engine rotational speed is low (in the low range), and the demanded engine load is large (in the large range).

(III) The third mode is an operation mode, in which the entire exhaust gas is supplied only to the first and second exhaust scrolls 21, 22, and the electric heater 14 is not energized. That is, as shown in FIG. 4B, in the third mode, the energization of the electric heater 14 is stopped in the state where the volume changing valve 25 is opened, and the wastegate valve 27 is closed.

Specifically, as shown in FIG. 5, the third mode is selected in the case where the engine rotational speed is low (in the low range), and the demanded engine load is middle (in the middle range). Alternatively, the third mode is selected in the case where the engine rotational speed is middle (in the middle range), and the demanded engine load is middle (in the middle range). Further alternatively, the third mode is selected in the case where the engine rotational speed is middle (in the middle range), and the demanded engine load is large (in the large range).

(IV) The fourth mode is an operation mode, in which a portion of the exhaust gas is supplied through the wastegate communication hole 26 toward the downstream side (toward the muffler) while bypassing the turbine impeller 11, and the electric heater 14 is not energized. That is, as shown in FIG. 4C, in the fourth mode, the energization of the electric heater 14 is stopped in the state where both of the volume changing valve 25 and the wastegate valve 27 are opened.

Specifically, as shown in FIG. 5, the fourth mode is selected in the case where the engine is in the idle state. Alternatively, the fourth mode is selected in the case where the engine rotational speed is low (in the low range), and the demanded engine load is small (in the small range). Further alternatively, the fourth mode is selected in the case where the engine rotational speed is middle (in the middle range), and the demanded engine load is small (in the small range). Further alternatively, the fourth mode is selected in the case where the engine rotational speed is high (in the high range), and the demanded engine load is large (in the large range). Further alternatively, the fourth mode is selected in the case where the engine rotational speed is high (in the high range), and the demanded engine load is middle (in the middle range). Further alternatively, the fourth mode is selected in the case where the engine rotational speed is high (in the high range), and the demanded engine load is small (in the small range).

(V) The fifth mode is an operation mode, in which a portion of the exhaust gas is supplied through the wastegate communication hole 26 toward the downstream side (toward the muffler) while bypassing the turbine impeller 11, and the exhaust gas to be supplied to the turbine impeller 11 after passing through the first exhaust scroll 21 is heated with the electric heater 14, unlike the fourth mode. That is, as shown in FIG. 4C, in the fifth mode, the electric heater 14 is energized in the state where both of the volume changing valve 25 and the wastegate valve 27 are opened.

Specifically, as shown in FIG. 5, the fifth mode is selected in the case where the quick heating of the catalytic converter is required, for instance, in the fast idle period on the cold engine start-up.

An example of the selection of the operation mode (one of the first to fifth modes) will be described with reference to FIGS. 6A to 7F.

FIGS. 6A to 6F are time charts, showing a change in the operation mode at the time of driving the engine from the idle state to the state where the opening degree of the throttle valve is changed to the full opening degree. As shown in FIG. 6F, the first mode is selected at the acceleration start time from the idle state, and the electric heater 14 is energized.

FIGS. 7A to 7F are time charts, showing the extension of the energization period of the electric heater 14. As shown in FIG. 7F, the energization period of the electric heater 14 is extended in comparison to the energization period of FIG. 6F, which is indicated by a dotted line in FIG. 7F. The energization period of the electric heater 14 is extended in one of (i) the state where the coolant temperature is lower than the predetermined coolant temperature, (ii) the state where the oil temperature is lower than the predetermined oil temperature, and (iii) the state where the exhaust temperature is lower than the predetermined exhaust temperature.

First Advantage of Embodiment

The turbocharger 12 of the present embodiment can increase the exhaust energy, which is supplied to the turbine impeller 11 by generating the heat from the electric heater 14.

Therefore, the drive force of the turbine impeller 11 can be increased by the exhaust gas to increase the boost pressure and thereby to improve the output torque of the engine. Therefore, the drivability can be improved by improving the fuel consumption and the turbo lag.

Second Advantage of Embodiment

The turbocharger 12 of the present embodiment is constructed such that the electric heater 14 is placed in the inside of the corresponding part of the exhaust passage 30 located in the turbine housing 13.

In this way, the distance from the electric heater 14 to the turbine impeller 11 can be shortened. Thus, the loss of the heat of the exhaust gas, which is heated by the electric heater 14, to the surrounding is limited, and the high temperature exhaust gas, which is heated by the electric heater 14, can be supplied to the turbine impeller 11. Thus, the time period, which is from the time of starting the energization of the electric heater 14 to the time of increasing of the boost pressure, can be minimized, and thereby the drivability can be improved. Furthermore, the heat loss of the electric heater 14 can be limited. Thereby, the boost pressure can be increased while limiting the electric power consumption of the electric heater 14.

Third Advantage of Embodiment

In the turbocharger 12 of the present embodiment, as discussed above, the electric heater 14 is placed only in the part of the exhaust passage 30, which is located in the first exhaust scroll 21 (small volume side).

In this way, the heating subject area, which is heated by the electric heater 14, can be reduced, and the size of the electric heater 14 can be reduced. As a result, the costs of the electric heater 14 can be limited, and the electric power consumption can be limited to reduce the battery load.

Furthermore, when the size of the electric heater 14 is reduced, the weight of the electric heater 14 is reduced. Thereby, the weight of the vehicle can be reduced to improve the fuel consumption.

Fourth Advantage of Embodiment

As discussed above, in the turbocharger 12 of the present embodiment, the energization of the electric heater 14 is controlled based on the engine rotational speed and the demanded engine load. Specifically, the electric heater 14 is energized at the acceleration start time, in which the large engine output is required, in the state where the engine rotational speed is low (in the low range), and the exhaust energy is reduced.

In this way, the energization period of the electric heater 14 can be limited only to the required time. Thus, the electric power consumption of the electric heater 14 can be limited, and thereby the fuel consumption can be improved.

Fifth Advantage of Embodiment

In the turbocharger 12 of the present embodiment, as discussed above, the energization period of the electric heater 14 is extended in one of (i) the state where the coolant temperature is lower than the predetermined coolant temperature, (ii) the state where the oil temperature is lower than the predetermined oil temperature, and (iii) the state where the exhaust temperature is lower than the predetermined exhaust temperature.

When the energization period of the electric heater 14 is increased in the state of the low coolant temperature or the state of the low oil temperature, the boost pressure can be increased to increase the engine output. Thus, the deterioration of the driveability caused by the high viscosity of the lubricating oil can be limited.

Also, when the energization period of the electric heater 14 is increased in the state where the exhaust temperature is low, the boost pressure can be increased to increase the engine output. Thereby, the deterioration of the driveability caused by the low exhaust temperature can be limited.

Sixth Advantage of Embodiment

As discussed above, in the turbocharger 12 of the present embodiment, the electric heater 14 is energized in the engine warming-up period (fast idle period) on the cold engine start-up.

Thereby, the catalytic converter, which is located on the downstream side of the turbocharger 12, can be heated with the high temperature exhaust gas, which is heated by the electric heater 14. Thus, the warming-up of the catalytic converter can be made faster (in the earlier stage). Thereby, both of the reduction of the exhaust emissions and the improvement of the fuel consumption can be made.

Seventh Advantage of Embodiment

As discussed above, in the turbocharger 12 of the present embodiment, the wastegate valve 27 is opened at the time of energizing the electric heater 14 in the warming-up period (e.g., the fast idle period).

In this way, besides the heating of the catalytic converter with the exhaust gas, which is heated by the electric heater 14, it is possible to heat the catalytic converter with the exhaust gas that has passed through the wastegate valve 27 (the high temperature exhaust gas, from which the heat is not taken by the turbine impeller 11). Therefore, the fast warming-up of the catalytic converter can be achieved to further enhance the reduction of the exhaust emissions.

Second Embodiment

A second embodiment of the present disclosure will be described with reference to FIGS. 8A to 10D. In the second embodiment, the components, which are similar to those of the first embodiment, will be indicated by the same reference numerals.

In the first embodiment, the wastegate valve 27 is provided to conduct the exhaust gas, which has passed through the volume changing communication hole 24 that is opened by the volume changing valve 25, toward the downstream side (toward the muffler) through the wastegate communication hole 26 opened by the wastegate valve 27 while bypassing the turbine impeller 11. In the closed state of the volume changing communication hole 24 closed by the volume changing valve 25, the bypassing of the exhaust gas through the wastegate communication hole 26 toward the downstream side (toward the muffler) is not possible.

In contrast, according to the second embodiment, the wastegate communication hole 26, which is associated with the wastegate valve 27, is placed on the upstream side of the volume changing valve 25 in the flow direction of the exhaust gas. Therefore, the exhaust gas, which is present on the upstream side of the volume changing valve 25, can be conducted through wastegate communication hole 26 toward the downstream side (toward the muffler) while bypassing the turbine impeller 11. Thereby, regardless of the open/close state of the volume changing valve 25 (i.e., regardless of the open/close state of the volume changing communication hole 24), the exhaust gas can be conducted through the wastegate communication hole 26 opened by the wastegate valve 27 toward the downstream side (toward the muffler) while bypassing the turbine impeller 11.

Next, the operations of the volume changing valve 25, the wastegate valve 27 and the electric heater 14 of the second embodiment will be described upon classifying them into the first to fifth modes (see FIG. 9).

The operations of the volume changing valve 25, the wastegate valve 27 and the electric heater 14 of the second embodiment in the first to fourth modes are the same as those of the first embodiment.

Figure 10A:
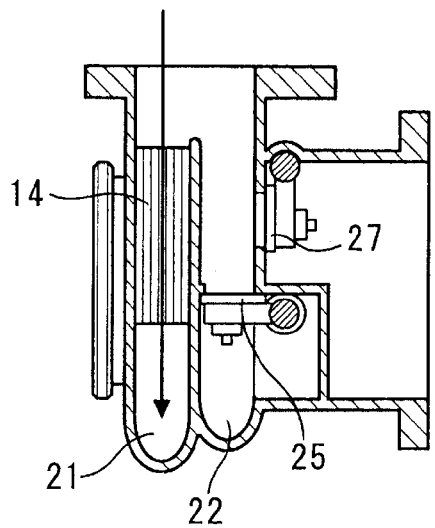
FIGS. 10A to 10D are schematic diagrams showing various operational states of the volume changing valve and the wastegate valve of the second embodiment.
Figure 10B:
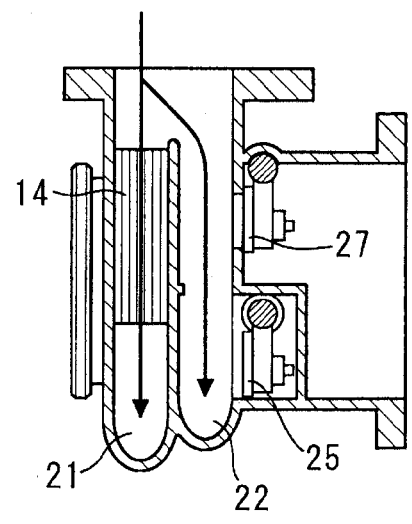
Figure 10C:
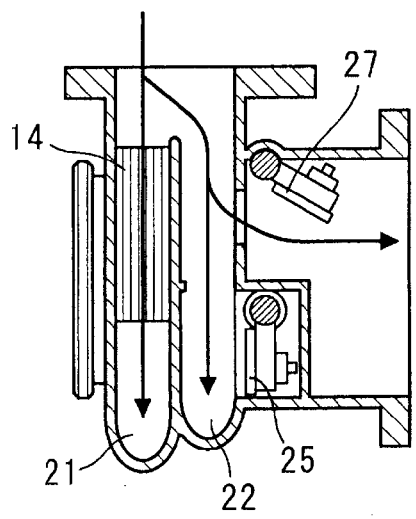

In the first and second modes, as shown in FIG. 10A, both of the volume changing valve 25 and the wastegate valve 27 are closed. Thereby, the exhaust gas is conducted only to the first exhaust scroll 21. In the third mode, as shown in FIG. 10B, the volume changing valve 25 is opened, and the wastegate valve 27 is closed. Thereby, the exhaust gas is conducted to both of the first and second exhaust scrolls 21, 22. In the fourth mode, as shown in FIG. 10C, both of the volume changing valve 25 and the wastegate valve 27 are opened. Thereby, the exhaust gas is conducted to both of the first and second exhaust scrolls 21, 22, and the portion of the exhaust gas is conducted through the wastegate communication hole 26 toward the downstream side (toward the muffler) while bypassing the turbine impeller 11.

Figure 10D:
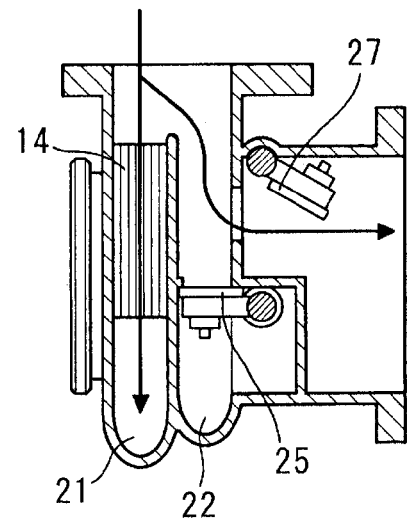

In the fifth mode, similar to the first embodiment, the electric heater 14 is energized, so that the exhaust gas to be supplied to the turbine impeller 11 after passing through the first exhaust scroll 21 is heated by the electric heater 14, and the portion of the high temperature exhaust gas is conducted to the catalytic converter through the wastegate communication hole 26 while bypassing the turbine impeller 11. However, in the second embodiment, unlike the first embodiment, the volume changing valve 25 is closed to close the part of the exhaust passage 30, which is from the second exhaust scroll 22 to the turbine impeller 11, as shown in FIG. 10D.

In the fifth mode, since the second exhaust scroll 22 is closed, the quantity of the exhaust gas, which is conducted to the turbine impeller 11, can be reduced in comparison to the first embodiment. That is, it is possible to reduce the ratio of the exhaust gas, from which the heat is taken by the turbine impeller 11, in, for example, the fast idle time on the cold engine start-up.

Thereby, the seventh advantage, which is discussed in the first embodiment, can be further enhanced.

That is, since the second exhaust scroll 22 is closed at the time of opening the wastegate valve 27 upon the energization of the electric heater 14 in the engine warming-up period (e.g., the fast idle period) on the cold engine start-up, it is possible to guide the large quantity of the high temperature exhaust gas, from which the heat is not taken by the turbine impeller 11, to the catalytic converter. As a result, the warming-up of the catalytic converter can be made further faster, so that the exhaust emission reducing effect can be further enhanced.

In the above embodiments, the on-off control operation of the electric heater 14 is discussed as the specific example of the control operation of the energization of the electric heater 14. Alternatively, the amount of electric power, which is supplied to the electric heater 14, may be duty controlled in a continuous manner or in a stepwise manner according to the engine operational state.

In the above embodiments, the electric heater 14 is energized in the state (e.g., the acceleration start time) where the engine rotational speed is low, and the demanded engine load is large. However, the condition for turning on the electric heater 14 is not limited to the one discussed in the above embodiments. For example, even in the case where the engine rotational speed is slightly increased from that of the idle, the electric heater 14 may be energized to increase the exhaust energy in the case where the demanded engine load is large in at least one of (i) the state where the coolant temperature is lower than the predetermined coolant temperature, (ii) the state where the oil temperature is lower than the predetermined oil temperature, and (iii) the state where the exhaust temperature is lower than the predetermined exhaust temperature.

In the above embodiments, as is obvious due to the presence of the catalytic converter, the present disclosure is applied to the turbocharger 12 of the gasoline engine. Alternatively, the present disclosure may be applied to a turbocharger of an engine (e.g., a diesel engine), which does not have the catalytic converter.

What is claimed is:

1. A supercharging apparatus for a vehicle, comprising:
a turbocharger that includes a turbine impeller, which is rotatable by exhaust gas discharged from an internal combustion engine of the vehicle; and
an electric heater that is placed in an exhaust passage, which extends from an exhaust outlet of the internal combustion engine to the turbine impeller, wherein the electric heater generates a heat when the electric heater is energized, wherein:
the turbocharger includes a turbine housing, through which the exhaust gas is swirled along the exhaust passage, and the swirled exhaust gas is discharged from the turbine housing to the turbine impeller;
the electric heater is placed in the turbine housing along the exhaust passage;
the turbine housing includes:
a first exhaust scroll that has a first exhaust outlet, through which the exhaust gas is discharged to an upstream side part of the turbine impeller that is located on an upstream side in a flow direction of the exhaust gas; and
a second exhaust scroll that has a second exhaust outlet, through which the exhaust gas is discharged to a downstream side part of the turbine impeller, which is located on a downstream side of the first exhaust outlet in the flow direction of the exhaust gas; and the electric heater is placed only in the first exhaust scroll along the exhaust passage.

2. The supercharging apparatus according to claim 1, further comprising an electronic control device that controls energization of the electric heater, wherein the electronic control device controls the energization of the electric heater based on:
- a rotational speed of the internal combustion engine; and
- a demanded load, which is demanded on the internal combustion engine.

3. The supercharging apparatus according to claim 2, wherein the electronic control device changes an energization period of the electric heater based on at least one of:
- a temperature of coolant, which is circulated through the internal combustion engine;
- a temperature of oil, which lubricates the internal combustion engine; and
- a temperature of the exhaust gas at a location between the exhaust outlet of the internal combustion engine and the electric heater along the exhaust passage.

4. The supercharging apparatus according to claim 1, further comprising an electronic control device that controls energization of the electric heater, wherein the electronic control device energizes the electric heater in a warming-up period of the internal combustion engine.

5. The supercharging apparatus according to claim 4, wherein:
- the turbocharger includes a wastegate valve that is adapted to open and close a wastegate communication hole, which is located along the exhaust passage and conducts the exhaust gas from an upstream side location, which is located on an upstream side of the turbine impeller in the flow direction of the exhaust gas, to a downstream side location, which is located on a downstream side of the turbine impeller in the flow direction of the exhaust gas, while bypassing the turbine impeller;
- the electronic control device controls opening and closing of the wastegate valve besides the energization of the electric heater; and
- the electronic control device energizes the electric heater and opens the wastegate valve to open the wastegate communication hole in the warming-up period of the internal combustion engine.

* * * * *